March 8, 1938.  J. A. WEAVER  2,110,515
LICENSE PLATE HOLDER
Filed April 26, 1937
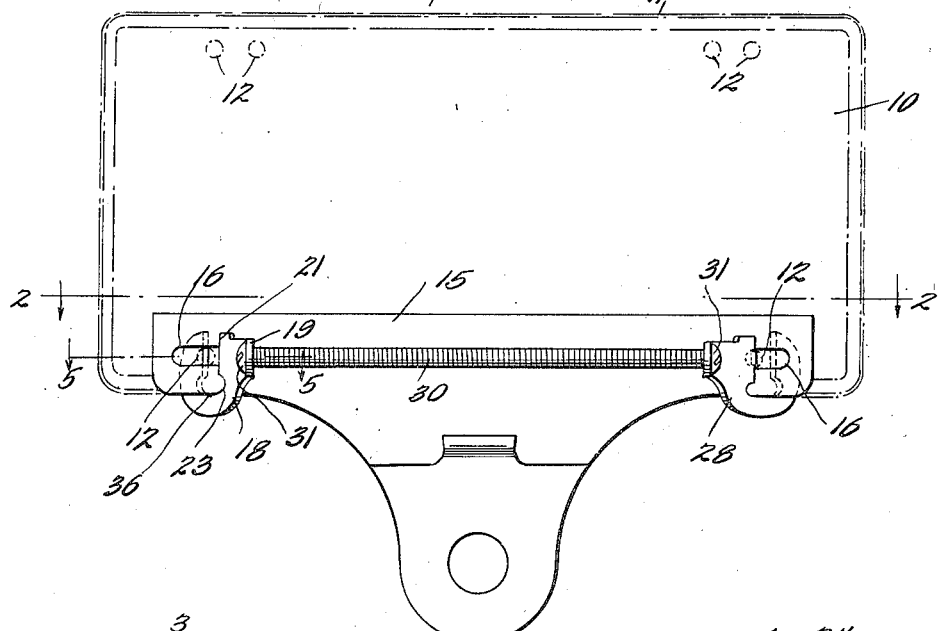
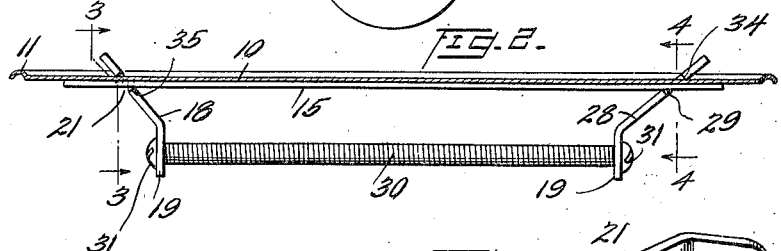
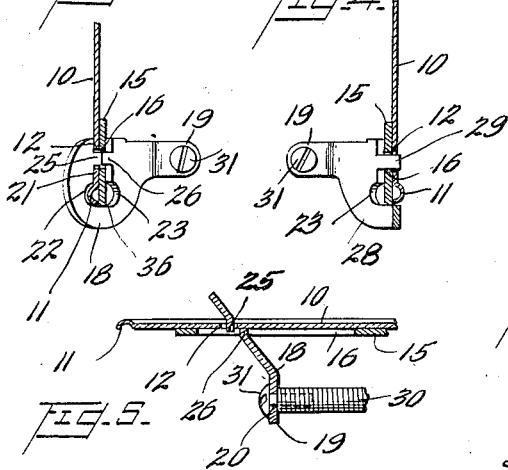
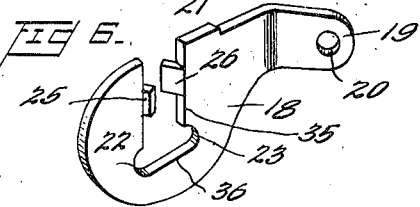
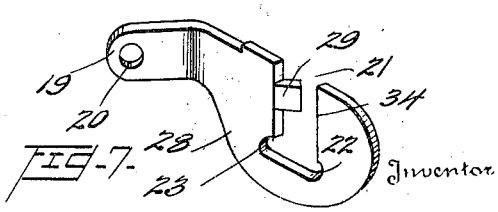
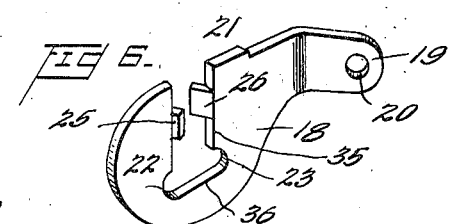
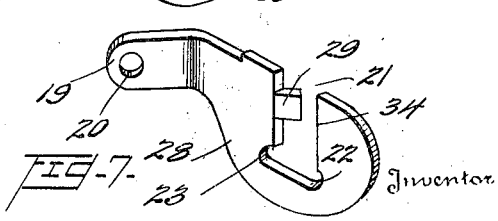
Inventor
J. Allen Weaver,
By Snelling & Hendricks
Attorneys Patented Mar. 8, 1938

2,110,515

UNITED STATES PATENT OFFICE 2,110,515

LICENSE PLATE HOLDER

John Allen Weaver, York, Pa.

Application April 26, 1937, Serial No. 139,086

7 Claims. (Cl. 40—125)

This invention relates to license plate holders and has for its principal object the provision of a simple holder which can be quickly affixed or removed but which will securely hold the license plate to its supporting bracket on an automobile in such a manner as to prevent rattling.

A further object of the invention is to provide a license plate holder consisting of simple parts readily and securely fastened together to form a substantially "fool-proof" device.

A still further object of the invention is to provide a license plate holder including a pair of clamps which may be canted by a spring in such manner as to securely bind the license plate against its bracket, preferably though not necessarily, including lugs which penetrate the slot in the bracket or the hole in the license plate or both.

In most, if not all, of the States, automobile dealers are given license plates which may be used on any automobile owned by them. In such cases it is convenient for a person, each salesman for example, to have a plate of his own and to secure this plate to any one of a number of cars on sale. There are devices of this type on the market but all with which I am familiar secure the license plate holder to some portion of the car in a relatively loose manner so that the license plate will rattle.

It is an object of the present invention to eliminate this noise and design the license plate holder so that there shall be no vibration of the plate independently of the bracket. A further improvement of my device over the prior art consists in forming the clamps of sheet metal, joining them by a spring and securing the spring to the clamps in a simple but highly efficient manner, as for example, by use of a machine screw which fits the helical spring.

While I have illustrated the device in its preferred form it is not essential that the slot in the clamp shall be either L-shaped or T-shaped or that there shall be two or even one positioning lug. My holder may secure the plate to the bracket whether the usual place of fastening is at the top or at the bottom of the plate and while I prefer that the spring of my device shall be positioned behind the license plate this is not at all necessary and the spring may be placed in front of the license plate at either the top or the bottom, provided only that the name of the State is not hidden.

In the drawing:

Figure 1 is an elevation of my device in position for temporarily securing a license plate to the supporting bracket of an automobile.

Figure 2 is a horizontal section on line 2—2 of Figure 1.

Figure 3 is a section taken on line 3—3 of Figure 2.

Figure 4 is a section taken on line 4—4 of Figure 2.

Figure 5 is a section taken on line 5—5 of Figure 1.

Figure 6 is a perspective view of a clamp having two lugs.

Figure 7 is a perspective view of a simpler form having only one lug.

In the drawing, the license plate 10 is of usual style, having a strengthening flange or bead 11 entirely around its periphery. The license plate is provided at top and bottom with round holes or slots, depending upon the State which issues the license, these holes 12 being so positioned that the plate may be bolted to a bracket which holds the license plate, either at the top or at the bottom, frequently at the bottom when the plate is at the front of the car and at the top when the plate is at the rear of the car, the form of the bracket however differing with different makes of cars. The license plate supporting holder or bracket 15 is shown in the drawing as of the type having a pair of slots 16 with which the lower holes 12 of the license plate may be alined so that bolts can extend through the license plate and bracket to hold the license plate permanently in position. My holder consists of two clamps which while they may be alike, in the preferred form one is shown in Figure 6 and numbered 18, while the other is as shown in Figure 7 and numbered 28. I intend also to make use of a still simpler clamp to be described later.

In the form shown in Figure 6 the clamp 18 is of sheet metal, the major portion forming a hook from which extends a relatively smaller portion or end 19, having therein a perforation 20. The main portion of the body of the clamp is slotted as at 21. At the bottom of this slot I usually form a communicating lateral slot having a bay 22 so that the slot is L-shaped and preferably I add a similar bay 23, so that the slot is T-shaped. In the simplest form of the clamp, which I may use but do not prefer, the slot 21 has plain parallel sides and is not undercut as at 22 or 23, which undercuts or bays are preferably arcuate as illustrated, the curvature being such as to snugly fit the beaded edge 11 of the usual license plate.

When the spring 30 is positioned behind or at the rear of the license plate the bay 22 only is needed but when the spring is positioned in front of the plate, the bay 23 will engage the beaded edge or flange which is present in all license plates to add stiffness to the plate. I prefer to have integral lugs 25 and 26 on the clamp 18, these lugs being bent at an angle to the sheet metal hook so that when the clamp is in plate-holding position the two lugs will be at right angles to the plane of the license plate; in other words, the ends of the lugs 25 and 26 are parallel although extending in opposite directions and the distance between them is such that the clamp may readily be inserted under or over, as the case may be, both the bracket, which is permanently secured to the car, and the license plate, which is held in desired position against the bracket. Both of the clamps may be of the type just described and as illustrated in Figure 6 but I much prefer that the second clamp be of simpler design in which case the clamp just described is preferably inserted in place before the second clamp is positioned, for convenience of insertion, and the two-lugged clamp, for similar reasons, is removed last.

The one-lug type of clamp, numbered 28, forms a pair with the clamp 18, differing only in the omission of a lug corresponding to lug 25. For convenience in description the single lug of clamp 28 is numbered 29 rather than 26. A coiled spring 30 is permanently secured to the off-set ends 19 of the two clamps of the pair, a highly practical and economical method of securing the spring to the clamps being a machine screw 31 which passes through the circular opening 20 in such end, the preferred angle of off-setting being roughly 45°.

In securing a license plate to the automobile bracket the plate is held in desired position by one hand and the clamp 18 is placed in position as for example at the lower right-hand corner of the license plate by holding the clamp 18 so that the other clamp secured to it by the spring 30, will project away from the plate in such position that the inner surfaces of the two lugs will be parallel to the surfaces of the plate and the bracket. The clamp 18 can then be readily pushed upwardly with the rear lug 26 in position to rock into the proximate slot 16 in the bracket and the proximate hole 12 in the license plate. It is not essential that the lug 26 be of sufficient length to project through both holes but I prefer this construction and I prefer that the lug 26 rather than the lug 25 shall project through the hole in the license plate. The operator's hand now slides along the spring to the simpler clamp here shown as 28 which can readily be inserted through the remaining lower hole or slot in the license plate by merely holding this clamp below and at right angles to the plate and in such position that its sole lug 29 shall project through the slot and the circular hole. In this clamp the lug 29 is of sufficient length to penetrate the alined openings in both the bracket and license plate. This lug 29, like the similar lug 26, rests upon the lower surface of the slot 16, while the opposite edge 34 of the slot has a knife edge engagement with the front of the license plate, and the curve of the bay 22 engages the beaded edge or flange of the license plate.

As may well be seen, while the lug 29 is advisable and is very convenient, it is not absolutely essential as the curved wall of bay 22 will hold the license plate in proper position and prevent it from being pulled upwardly or jarring in that direction. The lug 25 of clamp 18 preferably rests against the front face of the license plate although, as previously stated, this lug may enter the circular hole in the license plate, in which case I prefer that the lug 26 be made sufficiently short so that there shall be a knife edge engagement between the walls 35 of the slot and the rear face of the license holder bracket 15.

When the bracket is of such type that it is to be secured to the top of the license plate my device is applied in exactly the same way, except that the clamp 18 is at the upper left-hand corner if the spring 30 is to be in rear of the bracket. In such cases the edge 36 of the T slot rests upon the upper surface of the bracket. While, as stated, my device has been found to work well without using either of the two lugs on either of the clamps and omitting both bays a much securer fastening is had when the simple slot 21 has at least one bay which would be 22 if the device is to be used with the spring 30 in rear of the bracket as will almost always be the case. This bay 22 by its engagement with the upper beaded edge positively holds the plate from dropping down. In the present preferred form, however, I prefer that one of the clamps shall have two lugs and the other shall have one lug as with such a device the engagement is more secure and with a slight amount of practice the license plate holder can be installed practically as quickly and conveniently as in the simpler forms.

What I claim is:

1. A license plate holder consisting of a pair of clamps each having a slot therein to receive both the license plate and its supporting bracket, means to cant the two clamps about their slots to bind the license plate to the supporting bracket, and a positioning lug adjacent the slot of each clamp so that each lug may enter alined openings in the plate and the supporting bracket.

2. A license plate holder consisting of a pair of clamps each having a slot therein to receive both the license plate and its supporting bracket, means to cant the two clamps about their slots to bind the license plate to the supporting bracket, and two lugs adjacent the slot of one of said clamps and on opposite sides thereof, one of said lugs being adapted to enter alined openings in the plate and holder and the other lug to serve as a fulcrum.

3. A license plate holder consisting of two clamps each having a slot and an angularly offset perforated end, a helical spring, and a machine screw passing through each perforation and binding one end of the spring to the proximate clamp.

4. The device of claim 3 in which the clamps each have a positioning lug adapted to enter alined openings in the license plate and its bracket and to rest upon the bottom edge of the opening in the bracket so as to support the plate, and additional fulcruming means on at least one of the clamps.

5. A license plate holder clamp consisting of a sheet metal hook having a slot therein and having an end offset at an angle to the main body of the clamp, a pair of oppositely directed lugs extending into the slot and having their ends substantially parallel leaving a space between them very roughly twice the thickness of the sheet metal, whereby the hook may be inserted on a license plate and its supporting bracket with one of the lugs within alined openings in the plate and bracket and the other lug may serve as a fulcrum when the hook is canted to bind the plate to the bracket to hold the plate firmly in place.

6. In combination, a license plate having a beaded edge, a spring secured thereto, and a clamp secured to one end of the spring and having an open slot therein to receive both the license plate and its supporting bracket, said slot being enlarged laterally away from its mouth so as to clear the beaded edge of the license plate in order to limit slotwise movement of the plate.

7. In combination, a license plate, a license plate bracket, a pair of quickly detachable clamps and a coiled spring secured to one end of each clamp, each clamp having a slot therein and a positioning lug extending into the slot at an angle thereto, said clamps being held on the license plate and its bracket by the resilience of the spring which holds the two clamps at oppositely directed acute angles with the plane of the plate and bracket, thereby binding the plate to the bracket so as to avoid rattles due to vibration.

J. ALLEN WEAVER.